(12) United States Patent
Tedesco (10) Patent No.: US 7,134,263 B2
(45) Date of Patent: Nov. 14, 2006

(54) COMBINATION WEEDING AND RAKING TOOL

(76) Inventor: John Tedesco, 6022 Western Way, Lake Worth, FL (US) 33463

( * ) Notice: Subject to any disclaimer, the term of this patent is extended or adjusted under 35 U.S.C. 154(b) by 0 days.

(21) Appl. No.: 11/299,093

(22) Filed: Dec. 9, 2005

(65) Prior Publication Data
US 2006/0090446 A1    May 4, 2006

Related U.S. Application Data

(63) Continuation-in-part of application No. 10/789,064, filed on Feb. 26, 2004, now abandoned.

(51) Int. Cl.
*A01D 7/00* (2006.01)
(52) U.S. Cl. .................. 56/400.04; 56/400.06
(58) Field of Classification Search ............ 56/400.04, 56/400.18, 400.05, 400.06, 400.19; D8/13, D8/6
See application file for complete search history.

(56) References Cited

U.S. PATENT DOCUMENTS

| | | | | |
|---|---|---|---|---|
| 1,167,491 | A | * | 1/1916 | Gilson, Sr. .................. 172/374 |
| 3,258,903 | A | * | 7/1966 | Rienacker et al. ....... 56/400.18 |
| 4,212,150 | A | * | 7/1980 | Dmochowski ........... 56/400.06 |
| D274,116 | S | * | 6/1984 | Lidikay et al. ................. D8/6 |
| 4,483,133 | A | * | 11/1984 | Pasley ...................... 56/400.06 |
| D331,353 | S | * | 12/1992 | Valentine ........................ D8/6 |
| 5,305,591 | A | * | 4/1994 | Gibson, Jr. ................ 56/400.1 |
| 5,343,684 | A | * | 9/1994 | Siler, III .................. 56/400.08 |
| 5,626,009 | A | * | 5/1997 | Bower et al. ............ 56/400.06 |

* cited by examiner

*Primary Examiner*—Árpád Fábián Kovács
(74) *Attorney, Agent, or Firm*—McHale & Slavin, P.A.

(57) ABSTRACT

The present invention relates to hand operated gardening and landscaping tools for use in cultivating soil and/or removing inferior or unwanted plants from a selected area. More particularly, the present invention relates to a combination scuffle and rake assembly. The combination tool allows an operator to cut unwanted weeds below the ground surface and thereafter groom the weeded area without having to use separate tools to complete the task.

9 Claims, 10 Drawing Sheets

COMBINATION WEEDING AND RAKING TOOL

CROSS REFERENCE TO RELATED APPLICATIONS

This application is a continuation-in-part of U.S. patent application Ser. No. 10/789,064 filed Feb. 26, 2004, now abandoned, entitled Combination Weeding and Raking Tool.

FIELD OF THE INVENTION

This invention is directed toward a manually operable gardening or landscaping tool which can be used either as a weeder, as a rake or as a ground contouring tool. The person using the tool can use the same tool for each operation without having to switch tools. Thereby saving time and the added expense of additional tools.

BACKGROUND OF THE INVENTION

Methods and apparatus for expanding the usefulness of hand tools by affixing alternate types of tool heads to a single tool handle have been the subject of much inventive effort over the years. The basic approach of providing multipurpose tools flows naturally form the need to utilize a number of different hand tools serially in time to accomplish a gardening or landscaping task. In gardening or landscaping uses, a first tool type might be used to precondition the soil, and a second tool type might be needed to further prepare particular areas, or to complete processes which were missed on the initial pass. The use of a long-handled hoe followed by the use of a long-handled rake to collect the debris produced by the hoe and then an inverted long-handled rake to contour or groom the soil gives an example of where iterative uses of alternative tool types are commonly needed. Hence, multipurpose tools of wide varieties abound, as do devices where a number of different tool heads may be affixed to a single, specially adapted handle.

Common to hand operated gardening tools is the use of an elongated handle. Secured to one end of the handle is an implement for use in cultivating, weeding and/or grooming of the soil. The tools are typically arranged to complete a specific task and the tool is thereafter exchanged for the tool required to complete the next task. Attempts have been made to combine tools or to construct tools with interchangeable implements. However, such attempts typically employ the use of bayonet mounts or other clamping devices which do little to assist the interchange of tool heads on the handle.

DESCRIPTION OF THE PRIOR ART

U.S. Pat. Nos. 2,268,066 and 2,314,685 teach a rake attached to an elongated handle via a spring mechanism. The device further includes a weed cutter attached to the handle in a manner that allows the rake to be stood upright without assistance. The weed cutter is formed of metal having an elongated body which partly surrounds the handle to provide support and a "spoon" shaped and sharpened cutter end.

U.S. Pat. No. 3,987,609 teaches a manually operable garden tool which combines the functions of a rake and a weeder. The tool employs an elongated handle with a generally flat section coplanar with the handle. A plurality of spring tines essentially coplanar with the section are provided. Each tine is secured at one end to the curved periphery and extends outward at right angles whereby the handle, tines and section define a rake. An elongated weed blade extends in the same direction as the handle and is secured at one end of the handle. The other end of the blade lies in a plane parallel to the tines.

U.S. Pat. No. 3,921,725 teaches a combination hoe and fork device. The device includes a handle fixed to a blade by means of a tang. The tang curves upwardly from the blade and then generally at a right angle to the blade and is attached by a suitable socket in the usual manner. The fork is of standard construction having an outwardly extending stem which can be attached to the tang of the hoe with U-bolts or hose clamps.

U.S. Pat. No. 4,236,742 teaches a retractable rake for use as a courtesy rake by a golfer at a sand trap or for light raking chores in general. The rake has a plurality of projecting tines which diverge outwardly when they are in their extended position. When the rake is not in use, the tines are retractable into the shank of the rake so the rake is compact and may be stored and carried within a golf bag.

U.S. Pat. No. 4,843,667 teaches a combination broom, rake, and pruning knife for use as a household, yard, garden, or industrial tool. The combination tool includes an elongated handle. The handle has at one end a removable broom assembly that is held in place by a post, which fits in a socket, and a lock screw. A rake tine support chamber is mounted parallel to the broom support chamber. The rake tine support chamber provides mounting and support for a plurality of retractable rake tines, which may be provided with hooked ends. The retractable rake tines are arranged in two groups, one on each side of the centerline of the tool, each having a similar number of tines. Each group of rake tines is attached by a pivot pin to a sliding linkage. When the tines are extended, they are supported by the flared end of the rake tine support chamber and the broom head serves as a backing for the rake tines limiting their deflection. The rake tines may be retracted into the rake retraction chamber by pulling the sliding hand grip. The opposite end of the handle is provided with a removable knife which may be used by hand or attached the handle for pruning purposes.

U.S. Pat. No. 5,185,992 teaches a tool expanding assembly which provides the means for rapidly coupling any one of a number of different tool heads to a preexisting mother tool. The tool expanding assembly includes a pair of cylinder-like portions which are fabricated from metal and rigidly connected together. In use, one of the cylinder-like portions is fitted over the handle of the mother tool and fasteners are inserted to secure the assembly. The second cylinder-like portion is constructed to include a square J-shaped bayonet connector slot, which is adapted to receive corresponding male bayonet connector elements used to terminate the ends of various tool heads.

U.S. Pat. No. 5,411,101 teaches a combination cultivator and edging tool including a handle and a head attached to one end of the handle. The head includes a transverse support member and a row of long cultivator tines, each tapering from a point of connection to the support member toward a tip. The tines extend in a common plane of extension disposed generally perpendicular to the handle and the traverse support member. The head further includes a blade having a support edge and a sharpened edge opposite the support edge. The blade is disposed in the same plane as the handle and the traverse support member. In use, the handle is disposed at an angle to the ground for cultivating. The handle is alternatively disposed vertically with respect to the ground for edging.

U.S. Pat. No. 5,743,340 teaches a device for pulling weeds, plants, small trees and the like which includes an elongate handle portion terminating in a first end, with a leveraging head member attached to the first end. This leveraging member has a first side bearing a weed clamp having at least one pivoting jaw adapted to close proximate to a clamping surface and a second side opposite the first side bearing a lever arm for mechanical advantage.

Hand tools utilizing bayonet type mounts have the disadvantage of requiring the user to perform the desired task using two individual tools, wherein each of the tools has to be handled separately in order to do the job. Often changing tools with a bayonet mount takes longer than exchanging complete tools.

The prior art also fails to teach a combined tool that allows the operator to cultivate and change tools to groom without bending over to change tools. Standing upright lessens the strain on an individual's back and combining tools increases efficiency.

Thus, what is lacking in the art is a combination tool that includes a scuffle and rake for gardening and landscaping. The combination tool should include a loop type scuffle blade and a retractably mounted rake head. The loop shaped scuffle blade should allow weeding and cultivating operations to be performed while pushing or pulling on the elongated handle for increased efficiency. The combination tool should merely require the handle to be rotated to change tools, allowing cut vegetation to be raked or cultivated soil to be groomed without bending over to change tools. The rake head should be retractable and/or collapsible to facilitate weeding operations to be performed in tight areas.

SUMMARY OF THE INVENTION

This invention pertains to hand operated gardening and landscaping tools for use in cultivating soil and/or removing inferior or unwanted plants from a selected area. More particularly, the present invention relates to a combination scuffle and rake assembly. The combination tool allows an operator to cut unwanted weeds below the ground surface and thereafter groom the weeded area without having to use separate tools to complete the task.

The tool employs an elongated handle with a scuffle portion and rake portion attached at a distal end thereof. The scuffle portion comprises a generally elongated metal blade formed into a trapezoid shaped loop and sharpened on both edges. The metal blade is secured at the distal end of the handle at an obtuse angle with respect to the longitudinal centerline of the handle.

In one embodiment, the rake assembly is slidably mounted on the elongated handle and includes a locking means to secure the rake assembly in either a retracted or an extended position. The rake assembly includes a plurality of tines. Each tine is fixed in a diverging manner generally coplanar to the flat portion of the loop blade and includes a formed tip for drawing together leaves or cut grass as well as grooming loose soil. The center portion of each tine extends through a guide member secured to the distal end of the handle whereby moving the sliding member toward the distal end of the handle causes the tines to extend and diverge outwardly. The tines are positioned within the confines of the scuffle.

In an alternative embodiment, the assembly includes a guide member which is substantially longer than the guide member of the first embodiment. In this alternative embodiment the tines are secured to a sliding member at one end. The center portion of each tine extends through the guide member secured to the distal end of the handle whereby moving the sliding member toward the distal end of the handle causes the tines to extend and diverge outward. Since the length of the guide member is greater than the width of the scuffle the rake is able to cover an area of ground substantially larger than the area covered by the scuffle.

The construction of the device allows the rake to be locked into the retracted position while cultivating for easy access to confined areas. The rake assembly can then be extended so the tool can be used as a rake to gather cut weeds and/or groom the cultivated surface.

Accordingly, it is an objective of the instant invention to provide a novel combination tool that is versatile and efficient in use and lends itself to a variety of gardening and landscaping activities.

It is a further objective of the instant invention to provide a combination hand tool having a scuffle blade and a sliding retractable rake assembly.

It is yet another objective of the instant invention to provide a combination hand tool which provides a scuffle and a rake assembly having a set of folding and retracting tines.

It is a still further objective of the invention to provide a hand tool which can perform a plurality of tasks without using separate tools or changing the tool on the handle.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring now to the figures, there is shown a combination weeding and raking devices embodying the principles of the present invention. The combination hand tools provide convenience and efficiency by employing a scuffle and a rake in a single assembly to minimize operator stooping and tool exchange when gardening or landscaping. The combination tool also provides for shipping and storing in a compact manner.

The combination weeding and raking devices 100u include an elongated handle 10 of a type well known in the art, preferably constructed of wood, but alternatively may be constructed of fiberglass or metal or suitable combinations thereof. The elongated handle 10 has a proximal end 14, a distal end 16 and a gripping surface 12. The distal end 16 supports means to for cultivating a working surface illustrated herein as a scuffle assembly 20 and a means for grooming a working surface illustrated herein as an extended rake assembly 50 (FIGS. 1–6, 10, 11 and 15) or folded rake assembly 80 (FIGS. 7–9 and 12–14). The scuffle and the rake assembly are preferably positioned on the same side of axis A which extends through the longitudinal centerline of the elongated handle 10 (FIGS. 5, 11 and 13). This construction allows the operator to rotate the handle about the first axis to selectively utilize the scuffle or the rake without the need to change tools.

Figure 1:
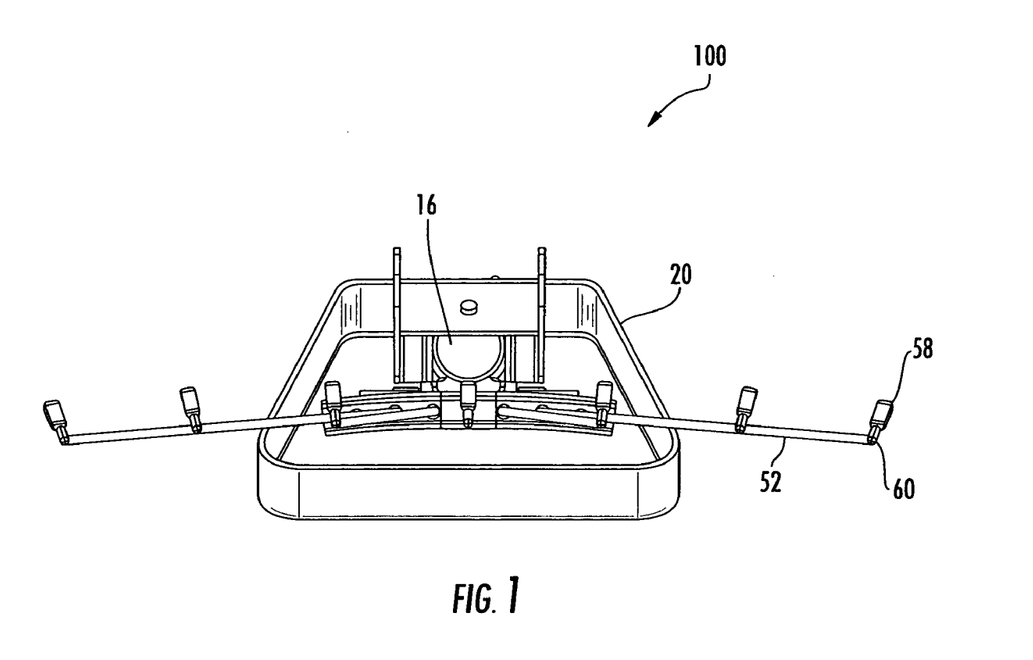
FIG. 1 is a front elevational view of the instant invention with the rake assembly in an extended position.
Figure 2:
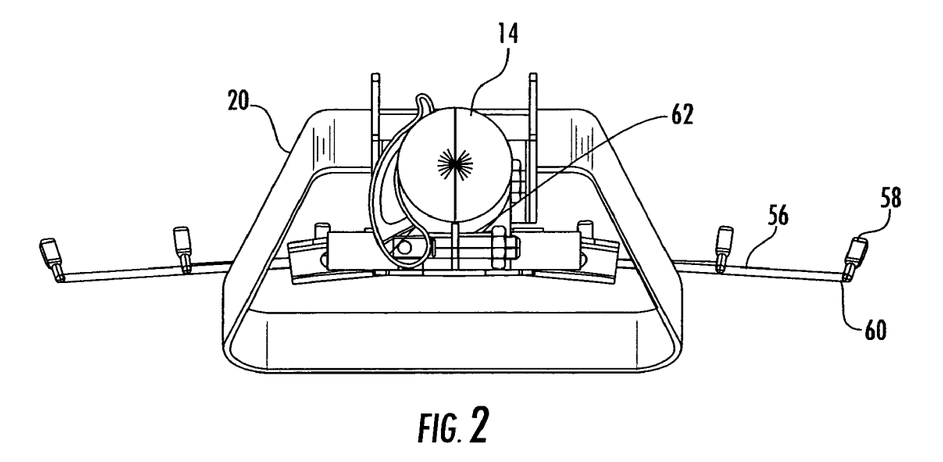
FIG. 2 is a rear elevational view of the instant invention with the rake assembly in an extended position.
Figure 3:
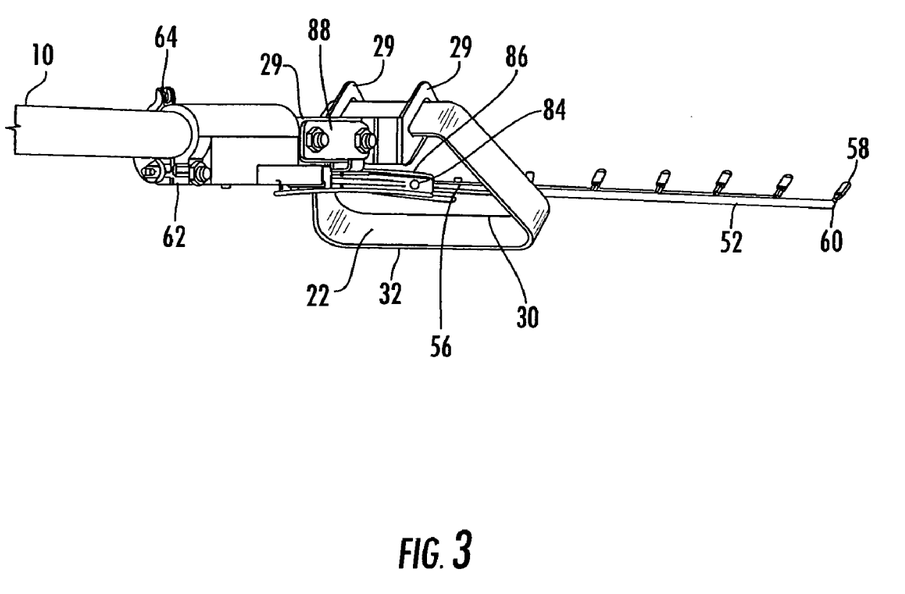
FIG. 3 is a side perspective view of the instant invention with the rake assembly in an extended position.
Figure 4:
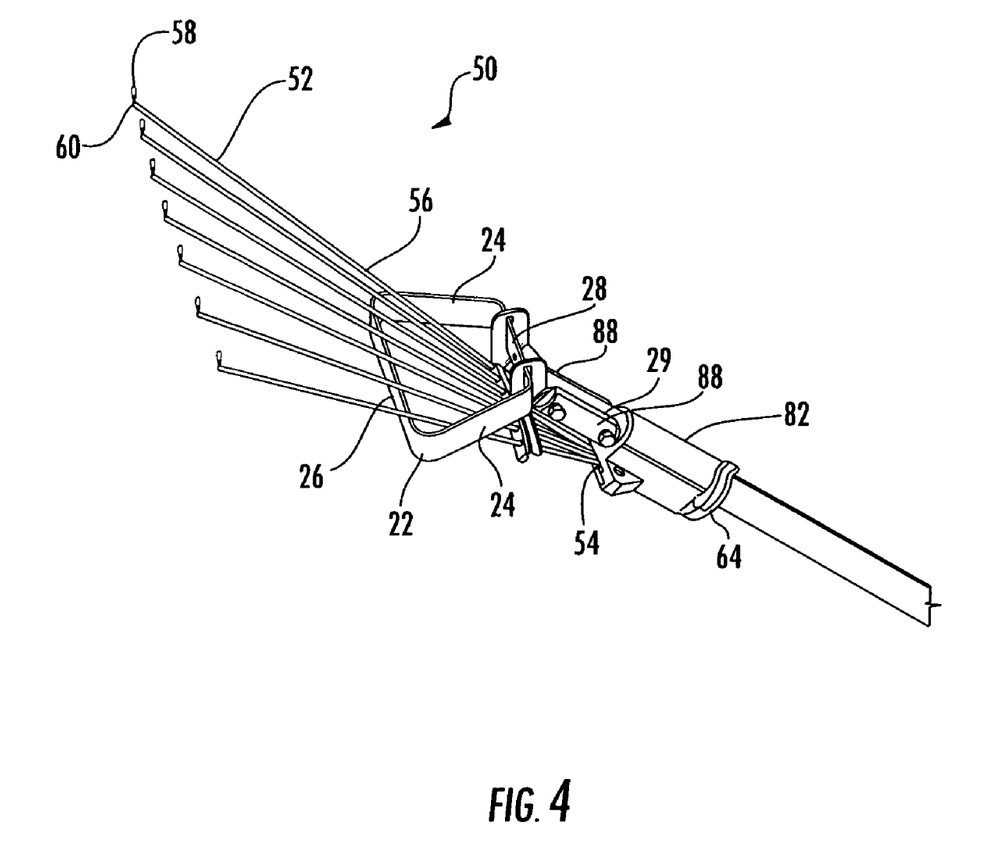
FIG. 4 is a front perspective view of the instant invention illustrating the position of the rake tines inside the scuffle.
Figure 5:
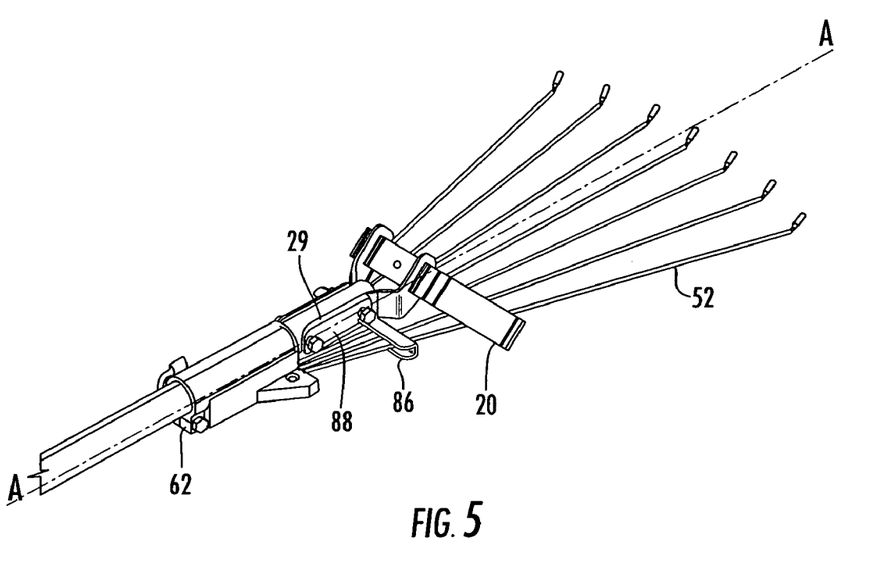
FIG. 5 is a side perspective view of the instant invention.
Figure 6:
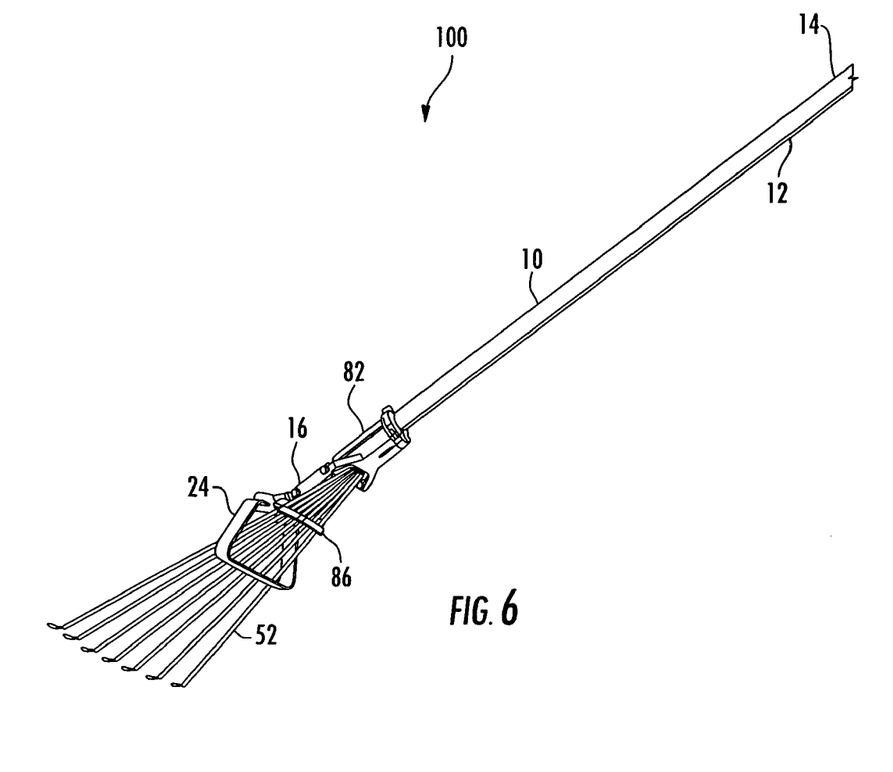
FIG. 6 is a bottom perspective view of the instant invention with the rake assembly in an extended position.

Referring to FIG. 4, in one embodiment the scuffle assembly includes a metal blade 22 formed generally into a trapezoid shape, including two upright portions 24, a bottom portion 26, and a top portion 28. Two brackets 29 secure the hoe assembly to the handle 10 at the desired angle. The top portion 28 of the hoe assembly is attached to each bracket 29 by passing through a slot formed in an end portion of a bracket member. The top portion 28 is not rigidly held in the slots. A small amount of play exists between the top portion 28 and the slots of the brackets 29. This play allows the scuffle to pivot back and forth slightly when it is cultivating a working surface. As shown in FIG. 3 the metal blade 22 includes a first cutting edge 30 and a second cutting edge 32. The first cutting edge 30 is generally constructed and arranged to cultivate a working surface during a pushing motion of the weeding and raking tool and the second cutting edge 32 is constructed and arranged to cultivate a working surface during a pulling motion of the weeding and raking tool. The scuffle is positioned at an obtuse angle with respect to axis A of the handle.

Figure 7:
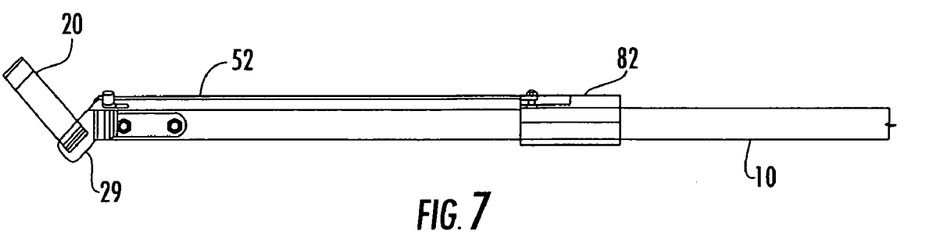
FIG. 7 is a side elevational view of the invention with the rake in the retracted position.
Figure 8:
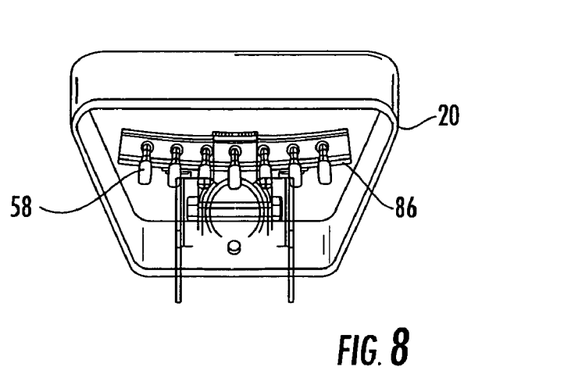
FIG. 8 is a front elevational of the instant invention with the rake in the retracted position.
Figure 9:
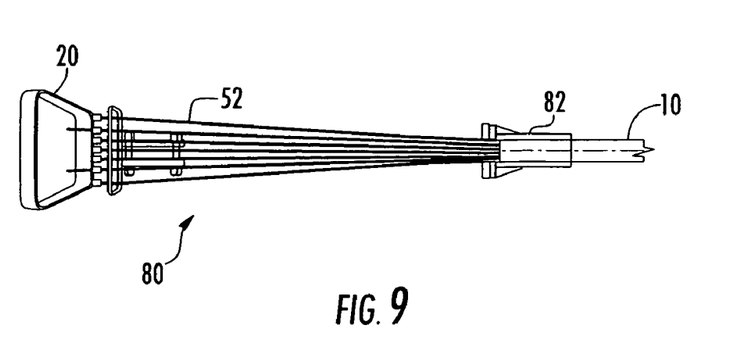
FIG. 9 is a top view of the instant invention with the rake in the retracted position.

Referring to FIGS. 3 and 4, the rake assembly 50 includes a plurality of tines 52 arranged in an outwardly diverging array. The tines 52 have a base end 54, a center portion 56 and a tip end 58. The tip end includes a hook portion 60 for gathering cut vegetation and grooming the cultivated soil. The tip ends of the tines extend in an upward direction and the scuffle extends in a downward direction with respect to the axis A of the handle. The base ends of the tines are attached to a sliding member 82. The rake assembly is slidably mounted along the first axis A and movable between an extended position and a retracted position. The rake 50 extends beyond the scuffle while the rake assembly is in its extended position and the scuffle extends beyond the rake while the rake assembly is in its retracted position, as shown in FIGS. 7–9. The sliding member 82 also includes a means for locking the rake assembly in the extended or retracted position. The locking means is illustrated as a lever actuated clamp 62, as shown in FIG. 3. When the rake assembly is to be extended or retracted, the clamp 62 is first released by pivoting lever 64 down and away from handle 10. The sliding member 82 can now be slid toward or away from the distal end of the handle and locked in its new position by pivoting the lever up towards the handle, thereby extending or retracting the rake assembly.

The rake assembly also includes a guide member 86 which is provided with apertures 84 through which the center portion 56 of the tines pass (FIG. 3). The guide member is attached to two brackets 88 positioned on either side of the handle and on the outside of brackets 29, as shown in FIGS. 4 and 5. Alternatively, the brackets 88 could be positioned inside of the brackets 29 and adjacent the handle. Utilizing this construction, movement of the sliding member 82 toward the distal end of the handle from the proximal end will cause the tines 52 to extend and diverge outwardly. Moving the sliding member 82 toward the proximal end 14 of the elongated handle 10 will cause the tines to fold together and retreat behind the scuffle.

Locating the scuffle and rake assembly on the same side of axis A allows the rake tines 52 to be positioned within the confines of the scuffle when they are in their extended position. This construction provides greater lateral stability of the flexible tines by confining the tines between the upright supports 24 of the scuffle. These supports will prevent the tines from flexing outwardly laterally too far during use which may lead to the tines becoming bent. The blade portion 26 of the scuffle also provides support for the tines when they are deflected in the vertical direction as a result of the user placing too much pressure downwardly when using the rake. In addition, the overall height of the device is substantially reduced since there are no tools on one side of the axis A. This reduction in height enables the device to be used in confined areas such as under porches and other structures with very little ground clearance.

Figure 10:
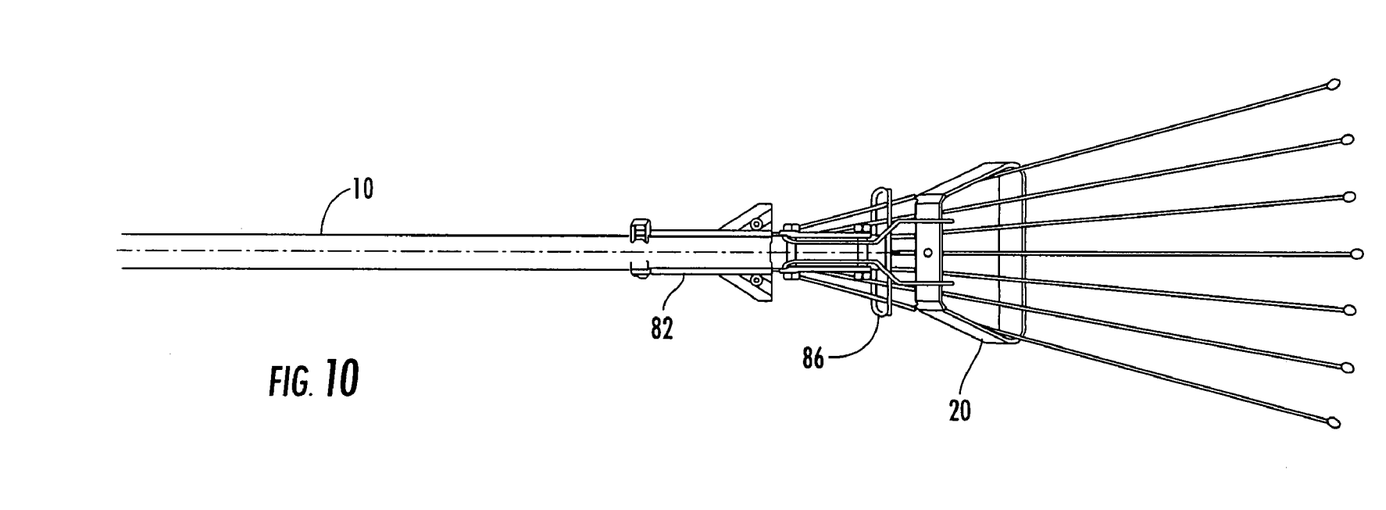
FIG. 10 is a bottom view of an alternative embodiment of the invention.
Figure 11:
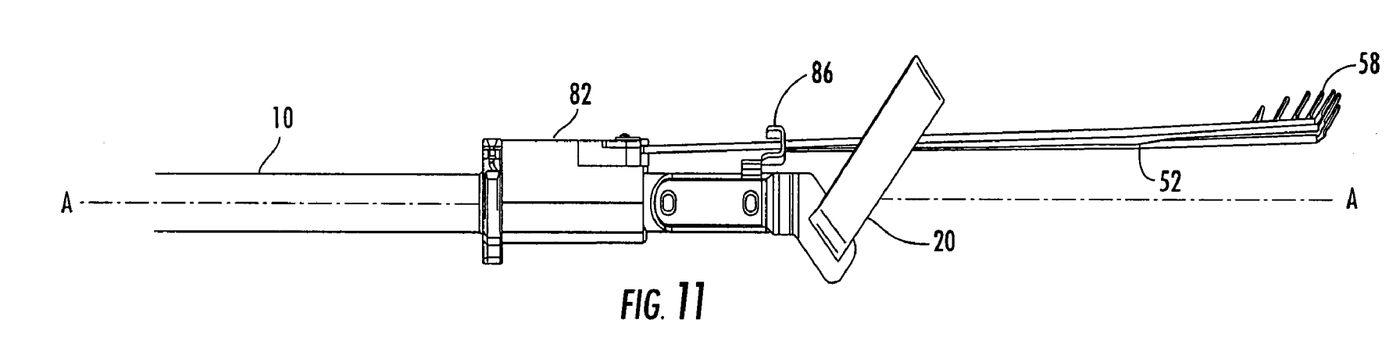
FIG. 11 is a side elevational view of an alternative embodiment of the instant invention.

In an alternative embodiment illustrated in FIGS. 10 and 11 the tips of the tines of the rake and the scuffle extend in the same direction with respect to the axis A of the handle of the tool (FIG. 11). This arrangement permits the user to alternatively use either the scuffle or the rake without turning the tool over.

Figure 12:
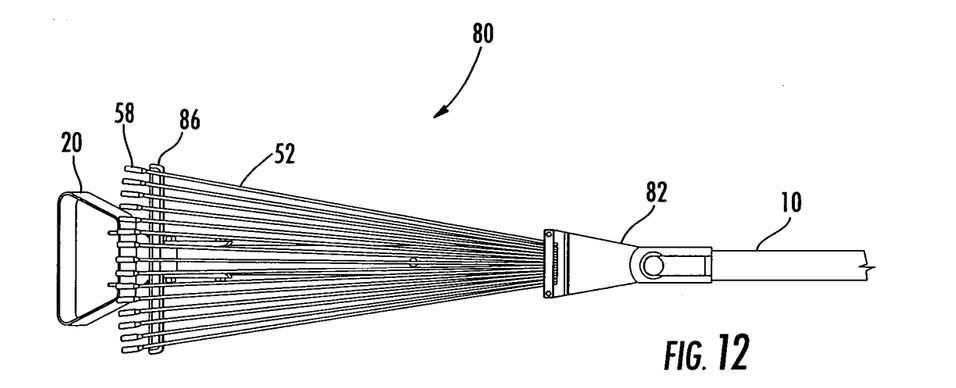
FIG. 12 is a bottom view of another alternative embodiment of the instant invention with the rake in the retracted position.
Figure 13:
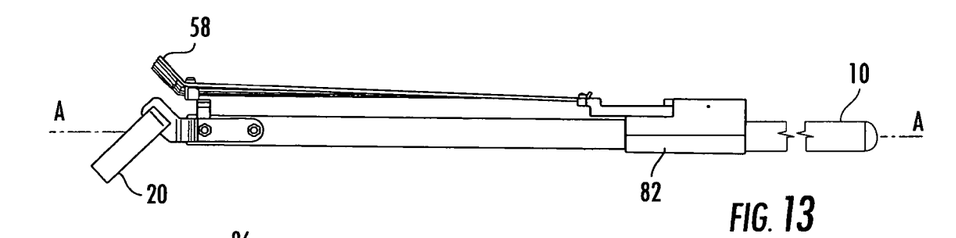
FIG. 13 is a side view of another alternative embodiment of the invention with the rake in the retracted position.
Figure 14:
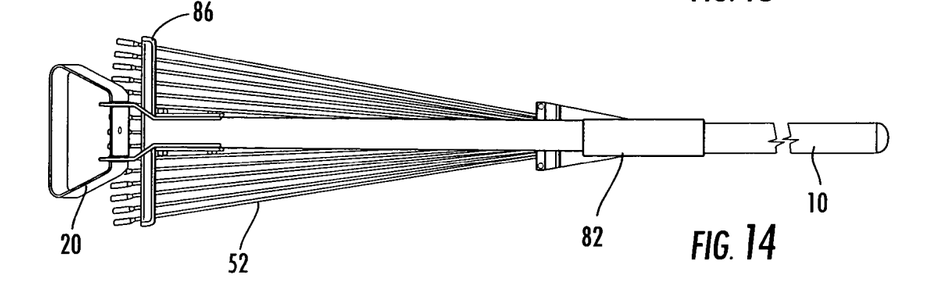
FIG. 14 is a top view of another alternative embodiment of the instant invention with the rake in the retracted position.
Figure 15:
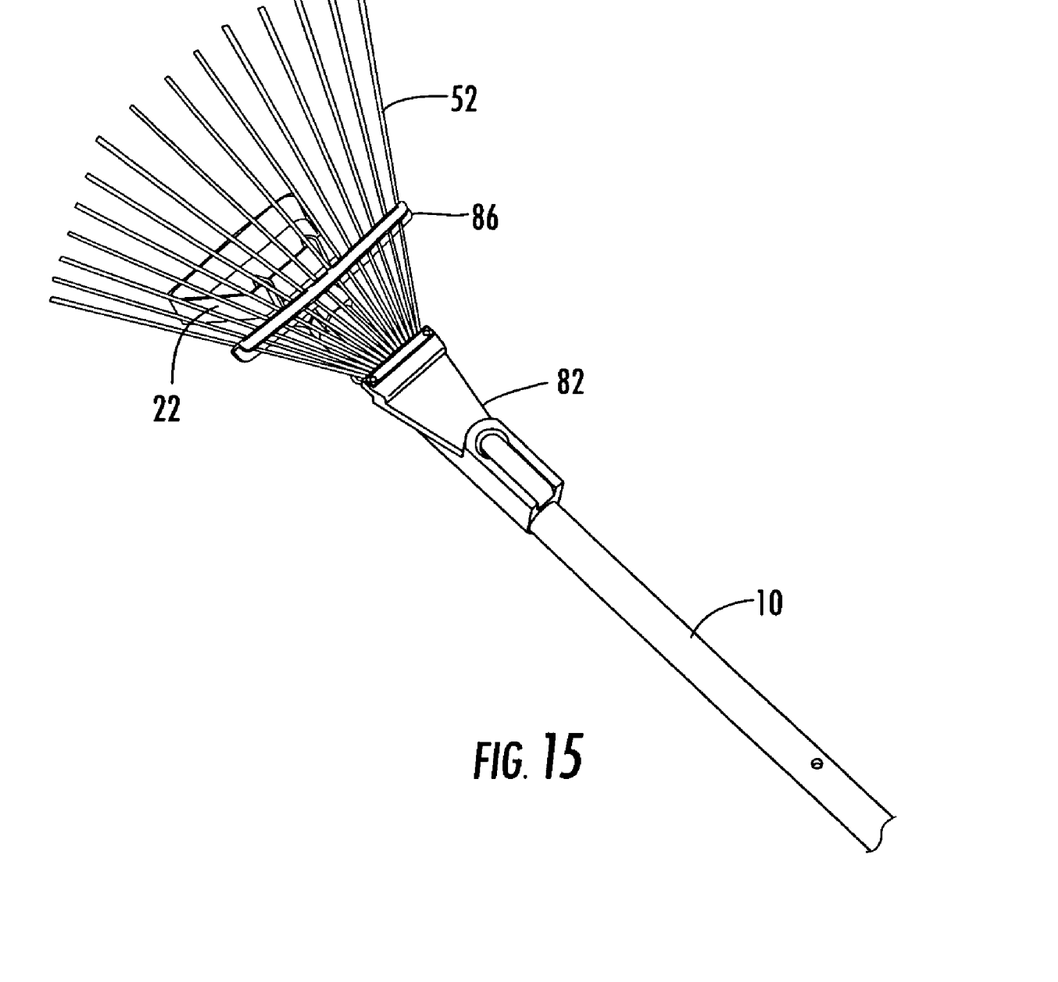
FIG. 15 is a bottom view of another alternative embodiment of the instant invention with the rake in the extended position.

A further alternative embodiment is illustrated in FIGS. 12–14 wherein the width of the rake is substantially greater than the width of the scuffle. This arrangement results in a rake with a larger number of tines and a substantially larger area of coverage. Since the number of tines exceeds the width of the scuffle, the guide 86 for the rake tines is positioned on the opposite side of axis A as the position of the scuffle (FIG. 13). FIG. 15 illustrates the rake tines in their extended position in this embodiment.

In another embodiment the entire device would be substantially smaller, similar to a single handed shovel or rake. This would enable the user to use the device in flowerbeds or bonsai gardens.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A combination weeding, raking and grooming tool comprising:

an elongated handle having a longitudinal centerline defining a first axis, a proximal end and a distal end, said proximal end constructed and arranged for gripping by an operator, said distal end including a means for cultivating a working surface and a means for grooming said working surface, said means for cultivating said working surface includes a metal blade, said metal blade is formed generally into a trapezoid, said metal blade includes two upright portions, a top portion connected to said upright portions and a bottom portion connected to said upright portions, said metal blade is mounted to said distal end of said elongated handle, traverse with respect to said first axis, a means for mounting said metal blade to said handle includes a pair of brackets, said brackets are mounted to opposite sides of said elongated handle and include outwardly extending end portions to which said top portion of said metal blade is mounted, said metal blade having a first cutting edge and a second cutting edge, said first cutting edge is constructed and arranged to cultivate said working surface during a pushing motion of said weeding, raking and grooming tool, said second cutting edge is constructed and arranged to cultivate said working surface during a pulling motion of said weeding, raking and grooming tool, said means for grooming includes a rake assembly, said rake assembly including a plurality of tines, said tines having a base end, a center portion and a tip end, said tip end including a hook constructed and arranged for gathering cut vegetation and grooming cultivated soil, said rake assembly is slidably mounted on said first axis and movable between an extended position and a retracted position, said rake assembly extends through the interior of the trapezoid formed by the metal blade, said rake assembly extends beyond said means for cultivating while in said extended position and said means for cultivating extends beyond said rake assembly while said rake assembly is in said retracted position, said rake assembly further including a sliding means to which one end of said tines are attached, a guide member including apertures through which the center portion of said tines pass, wherein said tines and said guide member cooperate to divert said tip ends of said tines laterally outwardly when said rake assembly is in said extended position and divert said tip ends of said tines laterally inwardly when said rake assembly is in said retracted position, whereby pushing or pulling said elongated handle allows said means for cultivating to cut vegetation below said working surface.

2. The combination weeding, raking and grooming tool according to claim 1 wherein said bottom portion of said metal blade is flat.

3. The combination weeding, raking and grooming tool according to claim 1 wherein said metal blade is oriented at an obtuse angle with respect to said first axis.

4. The combination weeding, raking and grooming tool according to claim 1 wherein the tip ends of said tines and said means for cultivating said working surface are oriented in opposite directions with respect to said first axis.

5. The combination weeding, raking and grooming tool according to claim 1 wherein said tip ends of said tines and said means for cultivating said work surface are oriented in the same direction with respect to said first axis.

6. A combination weeding, raking and grooming tool comprising:

an elongated handle having a longitudinal centerline defining a first axis, a proximal end and a distal end, said proximal end constructed and arranged for gripping by an operator, said distal end including a means for cultivating a working surface and a means for grooming said working surface, said means for cultivating said working surface includes a metal blade, said metal blade is formed generally into a trapezoid, said metal blade includes two upright portions, the distance between the two upright portions define a width of said means for cultivating, a top portion connected to said upright portions and a bottom portion connected to said upright portions, said metal blade is mounted to said distal end of said elongated handle, traverse with respect to said first axis, a means for mounting said metal blade to said handle includes a pair of brackets, said brackets are mounted to opposite sides of said elongated handle and include outwardly extending end portions to which said top portion of said metal blade is mounted, said metal blade having a first cutting edge and a second cutting edge, said first cutting edge is constructed and arranged to cultivate said working surface during a pushing motion of said weeding, raking and grooming tool, said second cutting edge is constructed and arranged to cultivate said working surface during a pulling motion of said weeding, raking and grooming tool, said means for grooming includes a rake assembly, said rake assembly including a plurality of tines, said tines having a base end, a center portion and a tip end, said tip end including a hook constructed and arranged for gathering cut vegetation and grooming cultivated soil, said rake assembly is slidably mounted on said first axis and movable between an extended position and a retracted position, said rake assembly further including a sliding means to which one end of said tines are attached, a guide member including apertures through which the center portion of said tines pass, the length of said guide member and the width of said plurality of tines is substantially greater than the width of said means for cultivating said work surface, said rake assembly extends longitudinally beyond said means for cultivating while in said extended position and said means for cultivating extends longitudinally beyond said rake assembly while said rake assembly is in said retracted position, wherein said tines and said guide cooperate to divert said tip ends of said tines laterally outwardly when said rake assembly is in said extended position and divert said tip ends of said tines laterally inwardly when said rake assembly is in said retracted position, whereby pushing or pulling said elongated handle allows said means for cultivating to cut vegetation below said working surface.

7. The combination weeding, raking and grooming tool according to claim 6 wherein said bottom portion of said metal blade is flat.

8. The combination weeding, raking and grooming tool according to claim 6 wherein said metal blade is oriented at an obtuse angle with respect to said first axis.

9. The combination weeding, raking and grooming tool according to claim 6 wherein said tip ends of said tines and said means for cultivating said working surface are oriented in opposite directions with respect to said first axis.

* * * * *